United States Patent
Kondapalli (10) Patent No.: US 9,032,460 B1
(45) Date of Patent: May 12, 2015

(54) CONTENT LOCALIZATION IN A NETWORK DEVICE

(71) Applicant: Marvell International Ltd., Hamilton (BM)

(72) Inventor: Raghu Kondapalli, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 15 days.

(21) Appl. No.: 13/947,806

(22) Filed: Jul. 22, 2013

Related U.S. Application Data (63) Continuation of application No. 11/728,339, filed on Mar. 26, 2007, now Pat. No. 8,495,691.

(60) Provisional application No. 60/791,582, filed on Apr. 12, 2006.

(51) Int. Cl.
*H04N 7/16* (2011.01)
*H04N 7/173* (2011.01)
*H04N 21/25* (2011.01)

(52) U.S. Cl.
CPC .................... *H04N 21/25* (2013.01)

(58) Field of Classification Search
USPC .................... 725/25, 107, 117–120
See application file for complete search history.

(56) References Cited

U.S. PATENT DOCUMENTS

| | | |
|---|---|---|
| 7,106,071 B2 | 9/2006 | Pharn et al. |
| 7,108,365 B2 | 9/2006 | Sekiya |
| 7,719,992 B1 | 5/2010 | Gourlay et al. |
| 2005/0160450 A1 | 7/2005 | Stephens et al. |
| 2005/0289585 A1 | 12/2005 | Pedlow et al. |
| 2007/0002736 A1 | 1/2007 | Gade et al. |
| 2007/0250880 A1 | 10/2007 | Hainline |
| 2008/0155094 A1 | 6/2008 | Roese et al. |
| 2008/0307881 A1 | 12/2008 | Schroth |

*Primary Examiner* — Nasser Goodarzi
*Assistant Examiner* — Fred Peng (57) ABSTRACT

A method of operating a first networking device includes receiving, from a media server, a cable length request message. The cable length request message includes data indicative of a length of a first networking cable arranged between the media server and the first networking device. The method includes determining a cumulative cable length based on the length of the first networking cable and a length of a second networking cable arranged between the first networking device and a media client. The method includes, in response to presence of a second networking device between the first networking device and the media client, sending a further cable length request message to the second networking device indicating the cumulative cable length. The method includes, in response to absence of the second networking device, sending a cable length response message to the media server indicating the cumulative cable length.

10 Claims, 9 Drawing Sheets

CONTENT LOCALIZATION IN A NETWORK DEVICE

CROSS-REFERENCE TO RELATED APPLICATIONS

This is a continuation of U.S. patent application Ser. No. 11/728,339, filed on Mar. 26, 2007, which claims the benefit of U.S. Provisional Application No. 60/791,582, filed on Apr. 12, 2006. The entire disclosures of the above applications are incorporated herein by reference.

FIELD

The present disclosure relates to content localization in a network device, and more specifically to limiting access based upon distance.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many audio and video applications are made digitally available to end users by a service provider. When a service provider provides media content to an end user, the service provider would like to ensure that the media content is consumed only by that end user and not by others, such as neighbors. Limiting media content to a given premises is sometimes referred to as localization.

Figure 1:
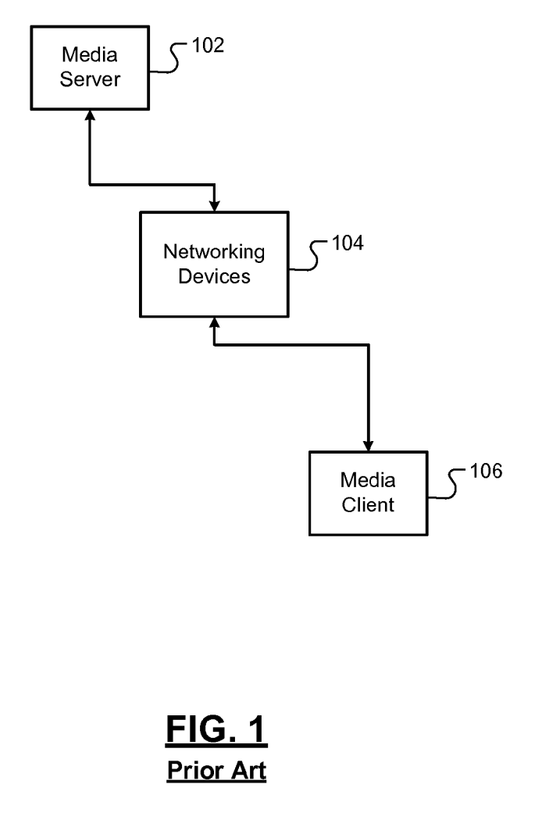
FIG. 1 is a functional block diagram of media localization according to the prior art.

Referring now to FIG. 1, a functional block diagram of a media localization system according to the prior art is presented. A media server 102 receives content from a service provider (not shown) and communicates with networking devices 104. A media client 106 communicates with the networking devices 104. In order for the media server 102 to determine whether to allow the media client 106 to access media content, the media server 102 sends a delay request frame, such as a ping message, to the networking devices 104.

Each of the networking devices 104 forwards the delay request frame to a subsequent one of the networking devices 104 until the delay request frame is sent to the media client 106. The media client 106 responds with a delay response frame, which is forwarded through the networking devices 104 to the media server 102.

The media server 102 can then estimate the physical distance between the media server 102 and the media client 106 by analyzing the time delay between the delay request frame and the delay response frame. This time delay must be adjusted by removing the typical delay experienced by the frames within each of the networking devices 104. Adjustment is problematic, however, because delays may vary greatly depending upon the current state of the network.

Figure 2:
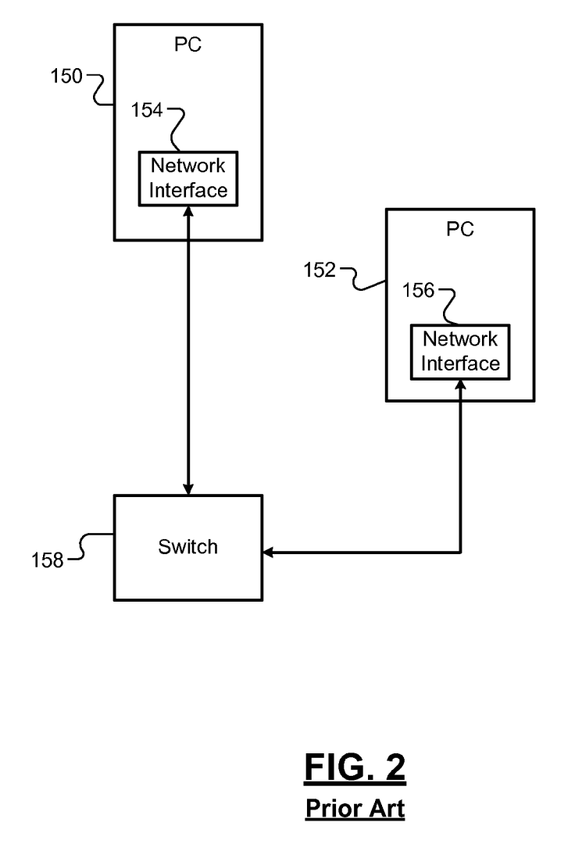
FIG. 2 is a functional block diagram of a simple computer network.

Referring now to FIG. 2, a functional block diagram of a simple computer network is depicted. The network includes first and second PCs 150 and 152, each containing a network interface, 154 and 156, respectively. The network interfaces 154 and 156 communicate with a networking device, such as a switch 158. The network interfaces 154 and 156 may include cable testing technology, such as Virtual Cable Tester™ from Marvell. Using cable testing, the network interfaces 154 and 156 can determine whether there are any wiring faults between them and the switch 158.

SUMMARY

A media server comprises a network interface and an access controller. The network interface includes a cable testing module that performs a physical measurement of a first length of a first cable attached to the network interface. The access controller selectively grants a media request made by a first media client via the first cable if a first distance based upon the first length is less than a threshold.

In other features, the first distance is equal to the first length when the first media client is attached to the first cable. The physical measurement comprises a Time Domain Reflectometry (TDR) measurement. The physical measurement comprises transmitting a media access control (MAC) frame down the first cable and waiting for a corresponding signal to be received. The physical measurement comprises transmitting a physical layer (PHY) frame down the first cable and waiting for a corresponding signal to be received.

In further features, the access controller includes a distance table that includes respective distances from the media server to a plurality of media clients including the first media client. The distance table contains validity information and a MAC address for each of the respective distances. The network interface includes a length table that includes lengths of cables that are attached to the network interface, the lengths including the first length of the first cable. An entry in the length table is removed after a corresponding one of the cables is disconnected.

In still other features, the network interface receives a length value from a networking device interposed between the network interface and the first media client. The length value is based upon a second length of a second cable attached between the networking device and the first media client. The first distance is based upon the first length and the second length. The network interface transmits a cable length request frame including a cumulative length value to the networking device and receives a cable length response frame including the length value from the networking device. The length value is based upon the cumulative length value and the second length. The cumulative length value is equal to the first length.

In other features, the access controller authenticates the first media client before granting the media request. A content localization system comprises the media server of claim 1; the first media client; and a networking device that communicates with the first media client and with the media server, that includes a cable testing module that performs a physical measurement of a second length of a second cable attached between the networking device and the first media client, and that transmits a message based upon the second length to the network interface.

A method comprises performing a physical measurement of a first length of a first cable; comparing a first distance based upon the first length to a threshold; and selectively granting a media request made by a first media client via the first cable based upon the comparing.

In other features, the first distance is equal to the first length when the first media client is attached to the first cable. The method further comprises performing a Time Domain Reflectometry (TDR) measurement. The method further comprises transmitting a media access control (MAC) frame down the first cable and waiting for a corresponding signal to be received. The method further comprises transmitting a physical layer (PHY) frame down the first cable and waiting for a corresponding signal to be received. The method further comprises storing a distance table that includes respective distances to a plurality of media clients including the first media client.

In further features, the distance table contains validity information and a MAC address for each of the respective distances. The method further comprises storing a length table that includes lengths of attached cables, the lengths including the first length of the first cable. The method further comprises removing an entry in the length table after a corresponding one of the cables is disconnected. The method further comprises receiving a length value based upon a second length of a second cable attached en route to the first media client. The first distance is based upon the first length and the second length.

In still other features, the method further comprises transmitting a cable length request frame including a cumulative length value and receiving a cable length response frame including the length value. The length value is based upon the cumulative length value and the second length. The cumulative length value is equal to the first length. The method further comprises authenticating the first media client before granting the media request.

A media server comprises network interfacing means for providing network access and for performing a physical measurement of a first length of a first cable attached to the network interfacing means; and access control means for selectively granting a media request made by a first media client via the first cable if a first distance based upon the first length is less than a threshold.

In other features, the first distance is equal to the first length when the first media client is attached to the first cable. The physical measurement comprises a Time Domain Reflectometry (TDR) measurement. The physical measurement comprises transmitting a media access control (MAC) frame down the first cable and waiting for a corresponding signal to be received. The physical measurement comprises transmitting a physical layer (PHY) frame down the first cable and waiting for a corresponding signal to be received.

In further features, the access control means includes distance look-up means for storing respective distances from the media server to a plurality of media clients including the first media client. The distance look-up means contains validity information and a MAC address for each of the respective distances. The network interfacing means includes length look-up means for storing lengths of cables that are attached to the network interfacing means, the lengths including the first length of the first cable. An entry in the length look-up means is removed after a corresponding one of the cables is disconnected.

In still other features, the network interfacing means receives a length value from a networking device interposed between the network interfacing means and the first media client. The length value is based upon a second length of a second cable attached between the networking device and the first media client. The first distance is based upon the first length and the second length. The network interfacing means transmits a cable length request frame including a cumulative length value to the networking device and receives a cable length response frame including the length value from the networking device. The length value is based upon the cumulative length value and the second length. The cumulative length value is equal to the first length.

In other features, the access control means authenticates the first media client before granting the media request. A content localization system comprises the media server of claim 1; the first media client; and a networking device that communicates with the first media client and with the media server, that includes cable testing means for performing a physical measurement of a second length of a second cable attached between the networking device and the first media client, and that transmits a message based upon the second length to the network interfacing means.

A computer program stored for use by a processor for operating a media server comprises performing a physical measurement of a first length of a first cable; comparing a first distance based upon the first length to a threshold; and selectively granting a media request made by a first media client via the first cable based upon the comparing.

In other features, the first distance is equal to the first length when the first media client is attached to the first cable. The computer program further comprises performing a Time Domain Reflectometry (TDR) measurement. The computer program further comprises transmitting a media access control (MAC) frame down the first cable and waiting for a corresponding signal to be received. The computer program further comprises transmitting a physical layer (PHY) frame down the first cable and waiting for a corresponding signal to be received.

In further features, the computer program further comprises storing a distance table that includes respective distances to a plurality of media clients including the first media client. The distance table contains validity information and a MAC address for each of the respective distances. The computer program further comprises storing a length table that includes lengths of attached cables, the lengths including the first length of the first cable. The computer program further comprises removing an entry in the length table after a corresponding one of the cables is disconnected.

In still other features, the computer program further comprises receiving a length value based upon a second length of a second cable attached en route to the first media client. The first distance is based upon the first length and the second length. The computer program further comprises transmitting a cable length request frame including a cumulative length value and receiving a cable length response frame including the length value. The length value is based upon the cumulative length value and the second length. The cumulative length value is equal to the first length. The computer program further comprises authenticating the first media client before granting the media request.

In other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 3:
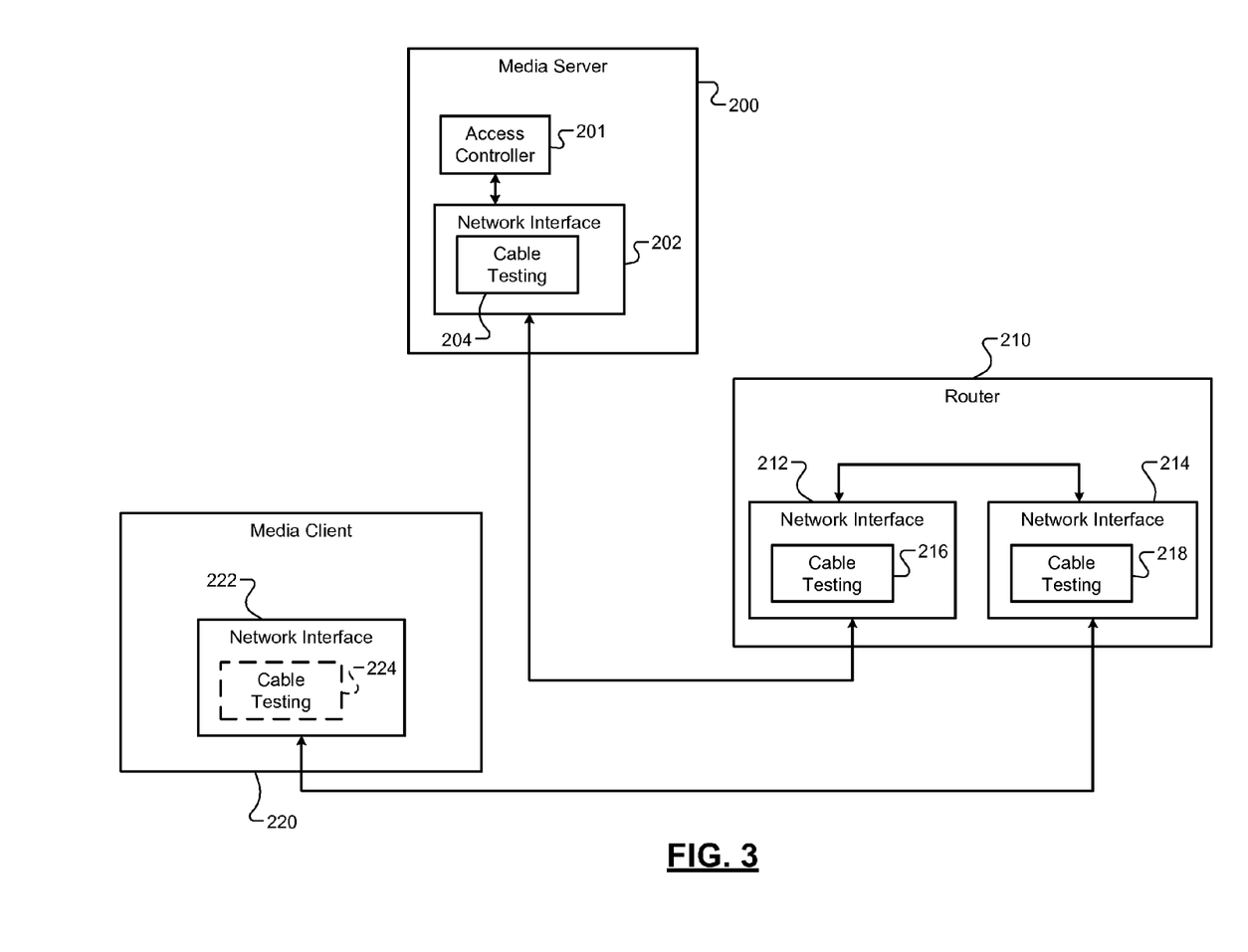
FIG. 3 is a functional block diagram of an exemplary content localization system.

Referring now to FIG. 3, a functional block diagram of an exemplary content localization system according to the principles of the present disclosure is presented. A media server 200 includes an access controller 201 and a media server network interface 202. The media server network interface 202 further includes a cable testing module 204. A router 210 includes first and second network interfaces 212 and 214, each including a cable testing module, 216 and 218, respectively. A media client 220 includes a media client network interface 222. The media client network interface 222 may include a cable testing module 224.

The first network interface 212 communicates with the media server network interface 202. The second network interface 214 communicates with the media client network interface 222. Cable testing technology can be used to accurately measure the lengths of each network cable between the media server 200 and the media client 220. The access controller 201 can use these lengths to estimate the physical distance between the media server 200 and the media client 220.

For example, the access controller 201 instructs the cable testing module 204 of the media server network interface 202 to measure the length of the network cable between the media server 200 and the router 210. This may be accomplished using Time Domain Reflectometry (TDR). For example, TDR is implemented by Marvell Virtual Cable Tester™. In TDR, a pulse is sent down a cable and distance is determined based upon the length of time before a reflected pulse is received. Using TDR may require that the device at the other end of the cable present an open or a short termination to ensure a strong reflection.

Physical length measurement may also be accomplished by sending a control signal from the media server network interface 202 to the first network interface 212. Upon receiving such control signal, the first network interface 212 will respond with a corresponding signal. The control signal may include a control frame, such as a physical layer (PHY) frame or a media access control (MAC) frame.

The first network interface 212 can respond to such a control signal without involving higher protocol layers, such as the network or transport layers, where delays vary based upon, for example, traffic volume. Delays in lower protocol layers may be quantified and programmatically removed to accurately determine cable length.

After determining the length of the cable between the media server 200 and the router 210, the access controller 201 instructs the media server network interface 202 to send a cable length request frame to the first network interface 212. The determined cable length is included in the cable length request frame. The cable length request frame is then forwarded to the second network interface 214. The cable testing module 218 of the second network interface 214 then measures the length of the network cable between the router 210 and the media client 220.

The measured length is added to the determined cable length contained in the received cable length request frame, and a cable length response frame is sent via the network interface 212 to the access controller 201. The access controller 201 now knows the physical cable length between the media client 220 and the media server 200. If the media client 220 is too far away, this may indicate that the media client 220 is actually within a neighbor's premises. The access controller 201 may then deny media requests from the media client 220.

Figure 4:
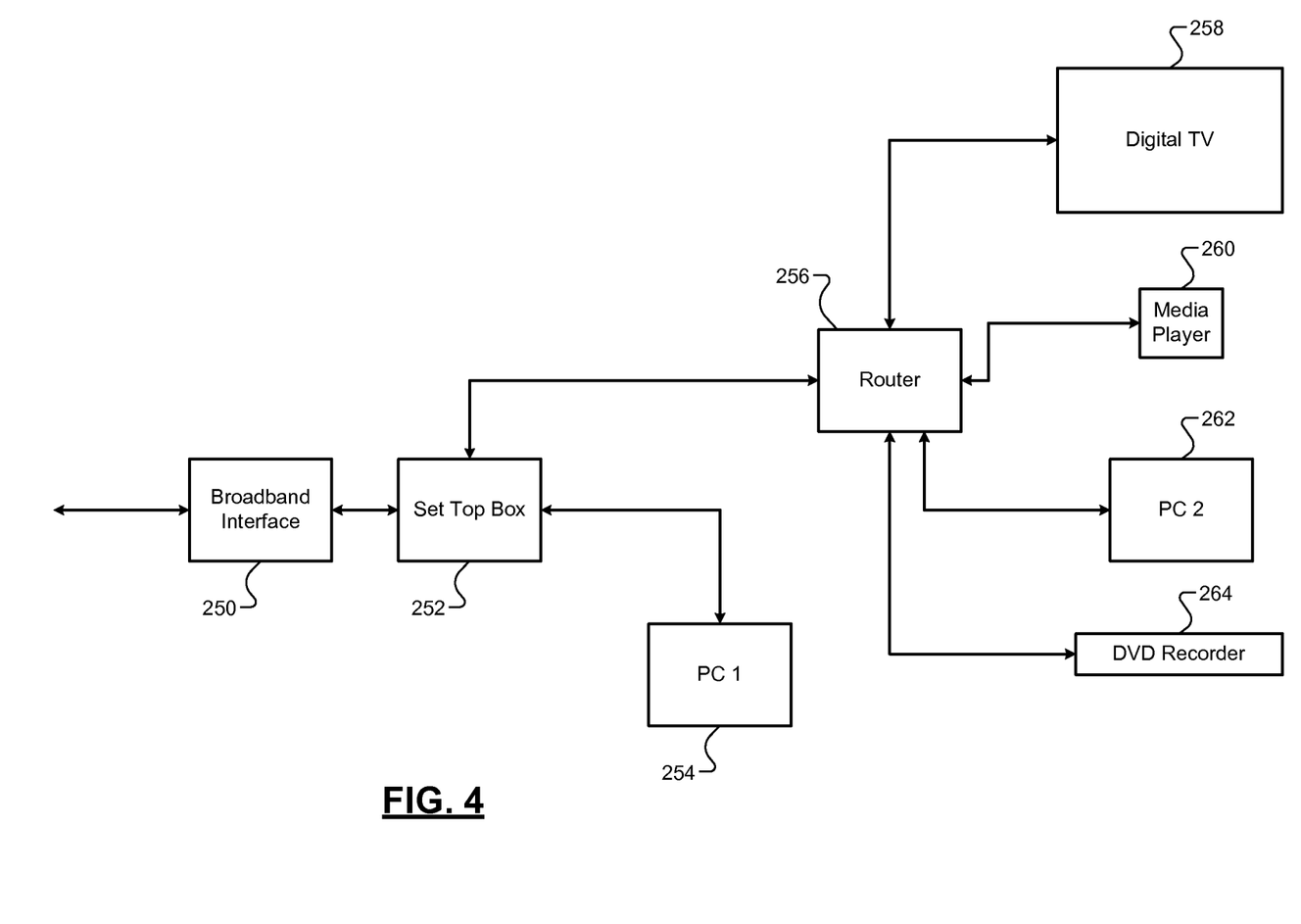
FIG. 4 is a functional block diagram depicting an exemplary home network.

Referring now to FIG. 4, a functional block diagram depicting an exemplary home network is presented. A broadband interface 250 receives content from a service provider (not shown). The broadband interface 250 may include, for example, coaxial cable, satellite, and/or digital subscriber line (DSL). A media server, such as a set top box 252, communicates with the broadband interface 250. In some implementations, the set top box 252 implements the broadband interface 250. A first PC 254 may communicate with the set top box 252.

A networking device, such as a router 256, communicates with the set top box 252. The router 256 also communicates with a number of components, such as a digital TV 258, a media player 260, a second PC 262, and a DVD recorder 264. Using the principles of the present disclosure, the set top box 252 can determine the cable length to any of the components 254, 258, 260, 260, 262, and 264 to decide whether to grant or deny any media requests. The set top box 252 may, in addition to using physical layer cable length measurements, employ higher layer authentication and/or authorization protocols.

Figure 5:
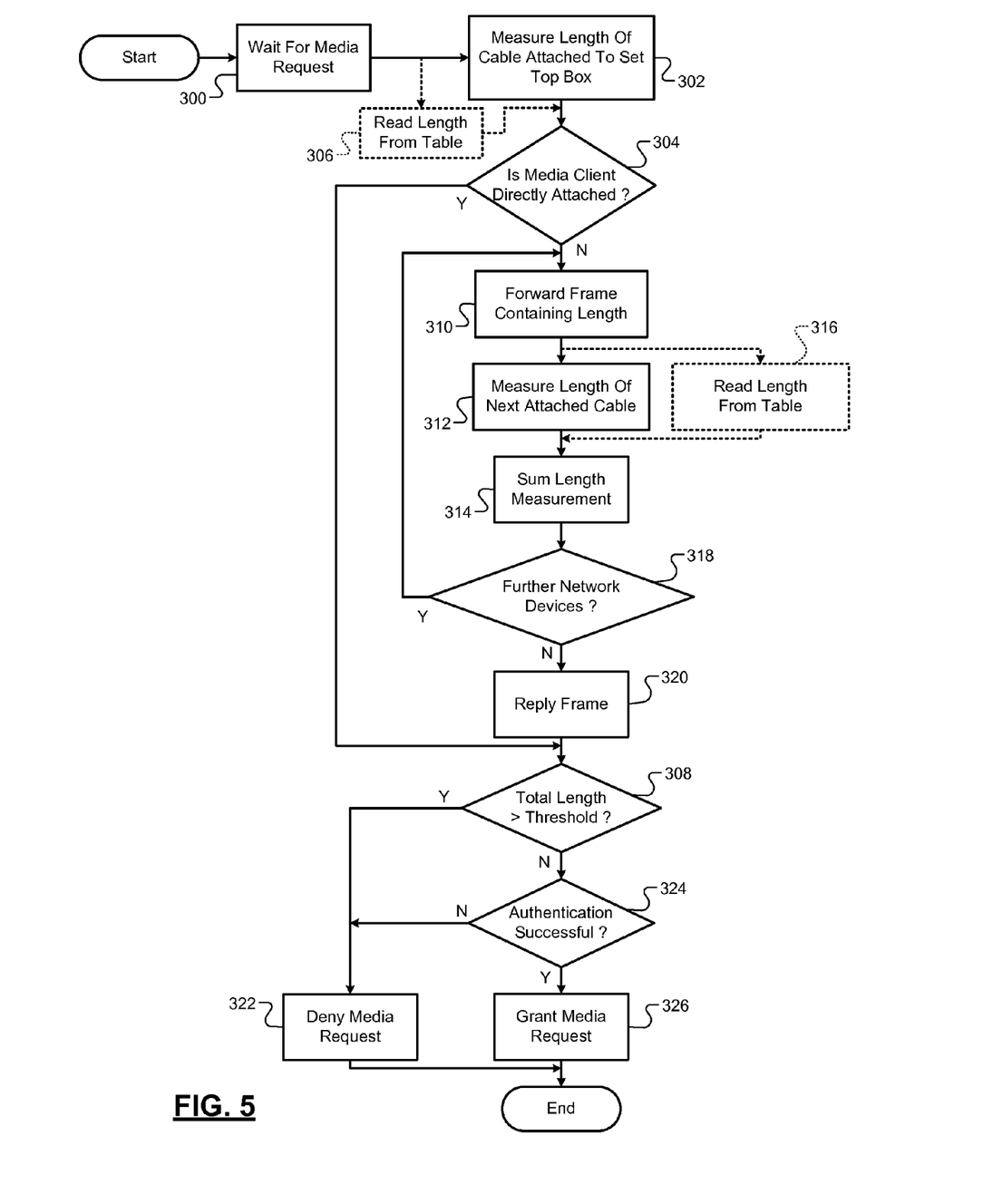
FIG. 5 is a flow chart depicting exemplary steps performed in determining whether to grant or deny a media request from a media client.

Referring now to FIG. 5, a flow chart depicts exemplary steps performed in deciding whether to grant or deny a media request. Control begins in step 300, where control waits for a media request. Once a media request is received, control continues in step 302. In step 302, the set top box measures the length of the first cable leading to the device making the media request, and control continues in step 304.

Alternatively, control may proceed from step 300 to step 306. In step 306, the length of the cable is read from a length table, and control continues with step 304. The length table may be updated each time a cable is connected to the set top box. The length table may be refreshed periodically, and entries may be removed when cables are disconnected. The length table may not be refreshed frequently as cable length changes are very unlikely to occur without the cable being disconnected.

In step 304, control determines whether the media client making the media request is directly attached to the set top box. If so, the total length of cable is now known, and control transfers to step 308. If the media client is not directly attached, further length measurements will be performed, so control transfers to step 310. In step 310, a cable length request frame containing the cumulative length of cable encountered thus far is forwarded to the next networking device in the path to the media client. Control continues in step 312, where the length of the next attached cable in the path to the media client is measured, and control continues in step 314.

Alternatively, control may proceed from step 310 to step 316, where a previously measured length of the attached cable is read from a length table, and control continues in step 314. As with the length table associated with the set top box, the length table associated with the networking device may be populated when new cables are connected.

In step 314, the measured length is added to the cumulative length received in the cable length request frame, and control continues in step 318. In step 318, if there are further networking devices between the present networking device and the media client, control returns to step 310; otherwise, control transfers to step 320. In step 320, the total cable length is now known and is sent in a cable length response frame to the media server. Control continues in step 308, where the media server compares the total cable length received in the cable length response frame to a threshold value.

If the total cable length is greater than the threshold value, control transfers to step 322; otherwise, control transfers to step 324. The threshold value may be determined when the service provider configures service for a customer. The threshold may differ based upon the type of media client attached or may be specified for each specific media client. In step 324, an authentication operation is performed.

If the authentication is successful, control transfers to step 326; otherwise, control transfers to step 322. In step 322, the media request is denied and control ends. After one or more denied media requests, the set top box may forward information about denied media requests to the service provider to assist in detecting attempted theft of service. In step 326, the media request is granted and control ends.

Figure 6:
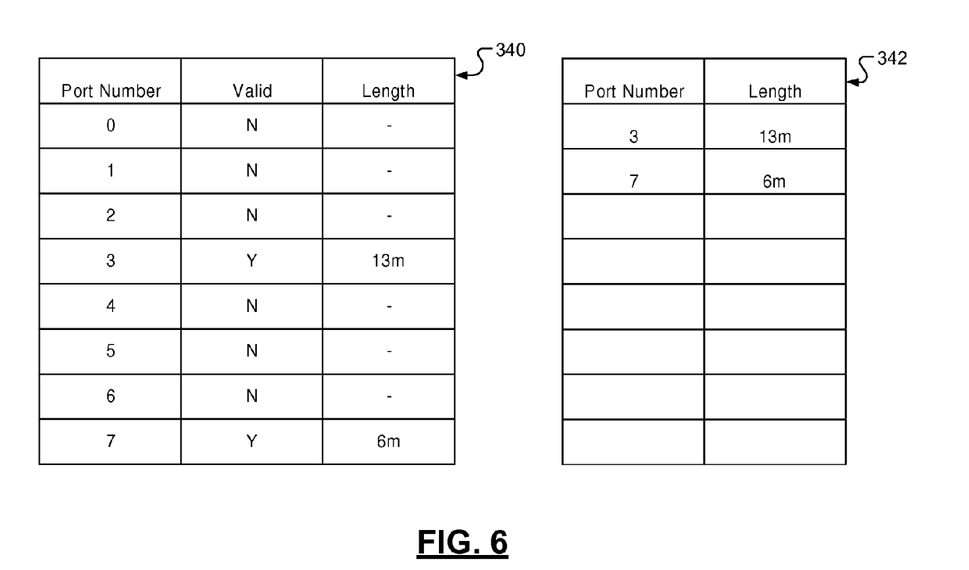
FIG. 6 is a graphical representation of exemplary tables storing attached cable lengths.

Referring now to FIG. 6, exemplary tables 340 and 342 storing attached cable lengths are depicted. The tables 340 and 342 may be used in steps 306 and 316 of FIG. 5. The table 340 includes an entry for each port number of the device—eight in this example. The table 340 includes a valid field and a length field. The valid field may be set when a length reading has been made and cleared when the attached cable is disconnected. The length field stores the length of the cable attached to the corresponding port.

Table 342 represents an alternative storage scheme. The table 342 contains as many entries as there are attached cables. The port number of the attached cable is stored along with the length of the corresponding cable. When the cable is disconnected, the entry is removed from the table 342.

Figure 7:
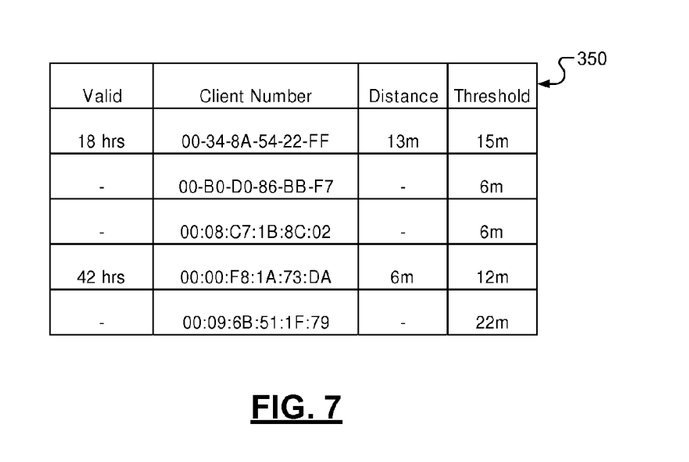
FIG. 7 is a graphical representation of an exemplary distance table containing distances to media clients.

Referring now to FIG. 7, an exemplary distance table 350 containing distances to media clients is depicted. The distance table 350 includes an entry for each media client that has made a request of the media server. The distance table 350 may also be populated with media clients attached to the network prior to the media clients making a request of the media server. The distance table 350 may include a valid field, which indicates whether the entry is valid, or alternatively, for how much longer the entry will be valid.

The distance table 350 includes a client number that uniquely identifies the media client. The client number may include, for example, a MAC address. The distance table 350 includes a distance measurement from the media server to the media client. The distance table 350 may also include a threshold value to which the distance is compared. The threshold may be specified separately for each media client, specified for each type of media client, specified for all media clients, etc.

Figure 8:
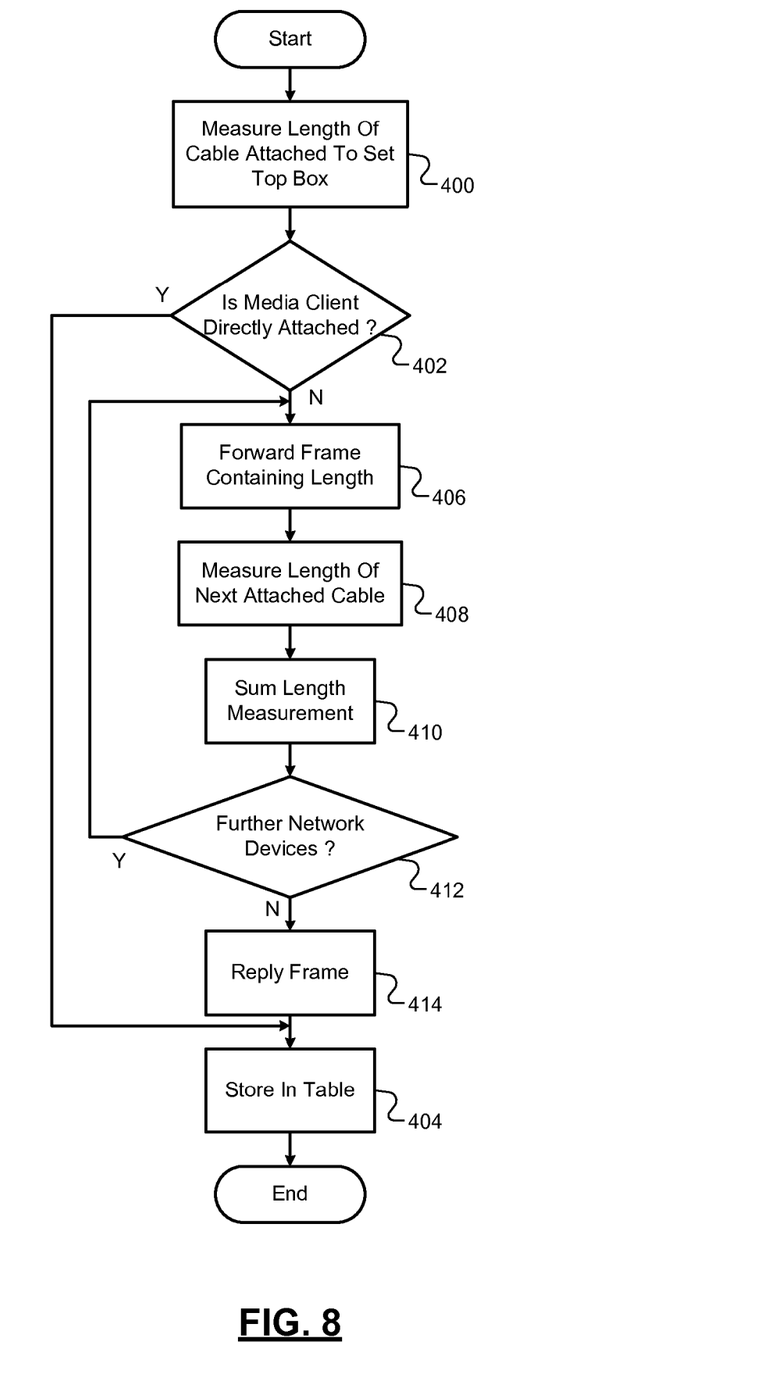
FIG. 8 is a flow chart depicting exemplary steps performed in measuring media client distance.

Referring now to FIG. 8, a flow chart depicts exemplary steps performed in measuring media client distance. Control begins in step 400, where the length of the cable attached to the set top box is measured. Control continues in step 402, where if the media client is directly attached to the set top box, control transfers to step 404; otherwise, control transfers to step 406. In step 406, a cable length request frame containing total cable length is forwarded to the next networking device and control continues in step 408.

In step 408, the length of the attached cable leading toward the media client is measured. Control continues in step 410, where the measured length is added to the length contained within the received cable length request frame. Control continues in step 412, where if there are further networking devices, control returns to step 406; otherwise, control transfers to step 414. In step 414, a cable length response frame containing the total cable length leading to the media client is sent to the media server. Control continues in step 404, where the measured distance to the media client is stored in a distance table, such as the distance table 350 of FIG. 7. Control then ends.

Figure 9:
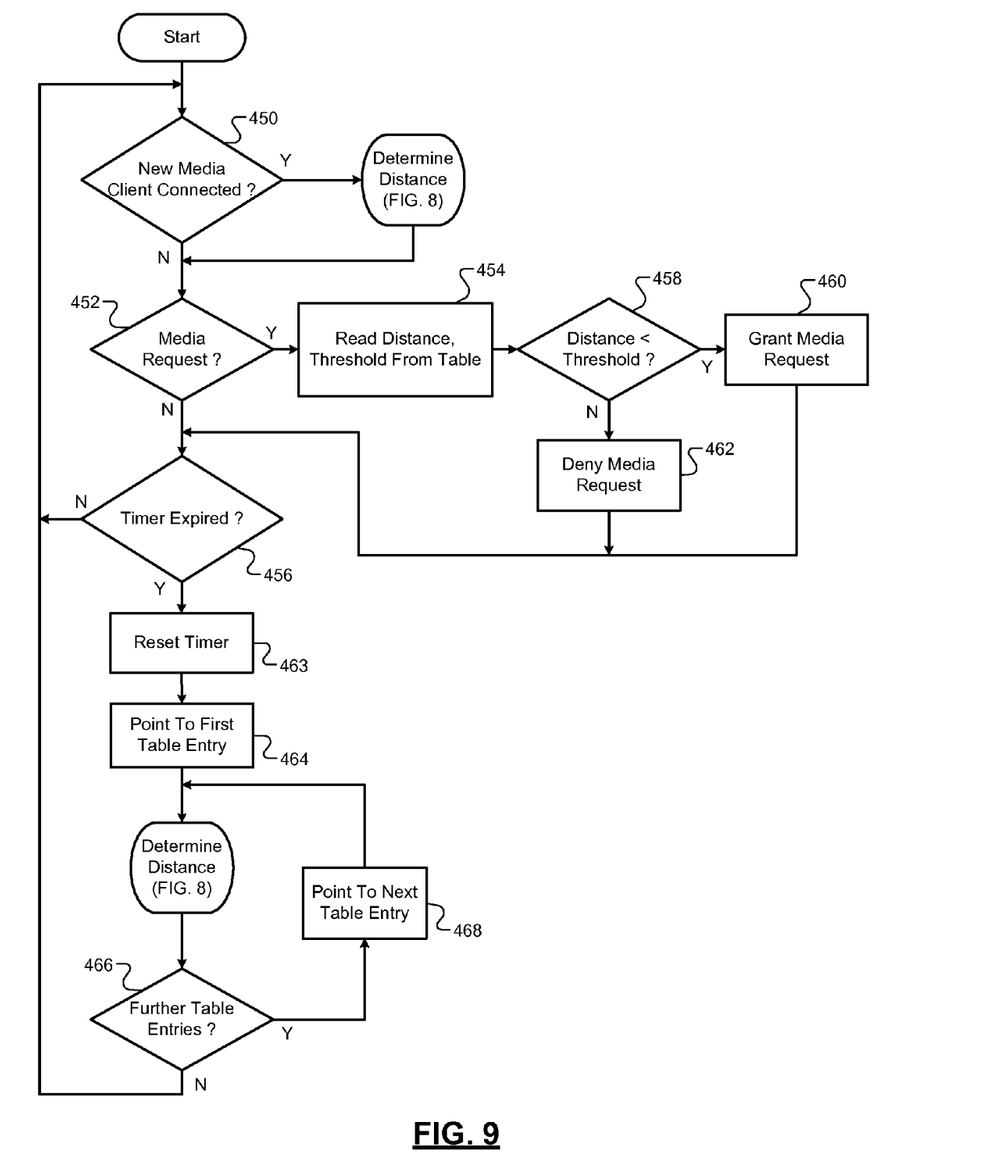
FIG. 9 is a flow chart depicting exemplary operation of a media server using a distance table.

Referring now to FIG. 9, a flow chart depicts exemplary operation of a media server using a distance table, such as the distance table 350 of FIG. 7. Control begins in step 450, where if a new media client has been connected, the distance to the new media client is determined according to FIG. 8, and control then resumes in step 452; otherwise, control transfers directly to step 452. In step 452, if there is a media request from a media client, control transfers to step 454; otherwise, control transfers to step 456.

In step 454, distance and threshold values are read from the table for the requesting media client. Control continues in step 458, where if the distance is less than the threshold value, control transfers to step 450; otherwise, control transfers to step 462. In step 460, the media request is granted and control continues in step 456. In step 462, the media request is denied and control continues in step 456.

In step 456, if a timer has expired, control transfers to step 463; otherwise, control returns to step 450. In step 463, the timer is reset and control continues in step 464. The timer duration is long enough to minimize network bandwidth used in updating lengths while still detecting changes in distance before much media content can be accessed.

In step 464, a pointer is set to point to the first table entry. Control then determines the distance to the media client of the table entry indicated by the pointer according to FIG. 8, and control resumes in step 466. In step 466, if there are further table entries, control transfers to step 468; otherwise, control returns to step 450. In step 468, the pointer is incremented to the next table entry. Control then determines the distance to the media client corresponding to the table entry indicated by the pointer, according to FIG. 8, and control resumes in step 466.

Figure 10A:
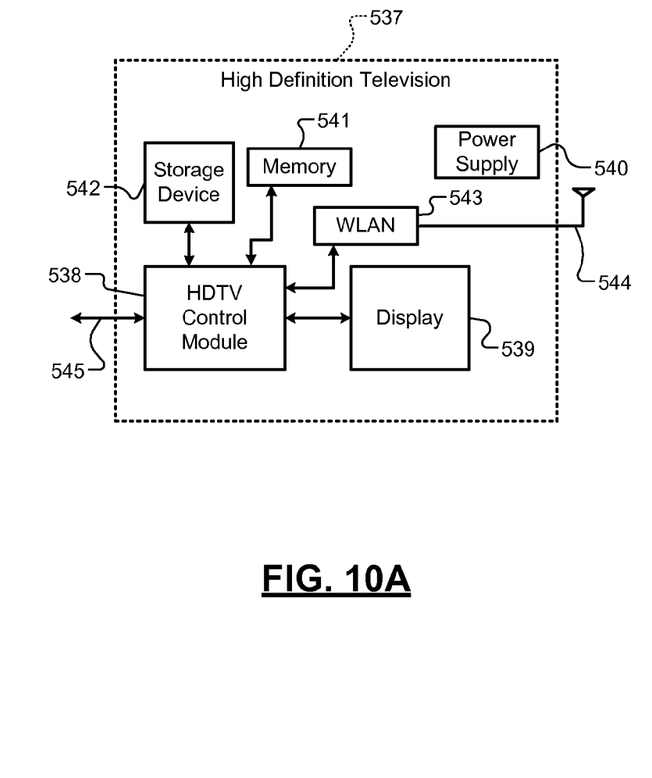
FIG. 10A is a functional block diagram of a high definition television.
Figure 10B:
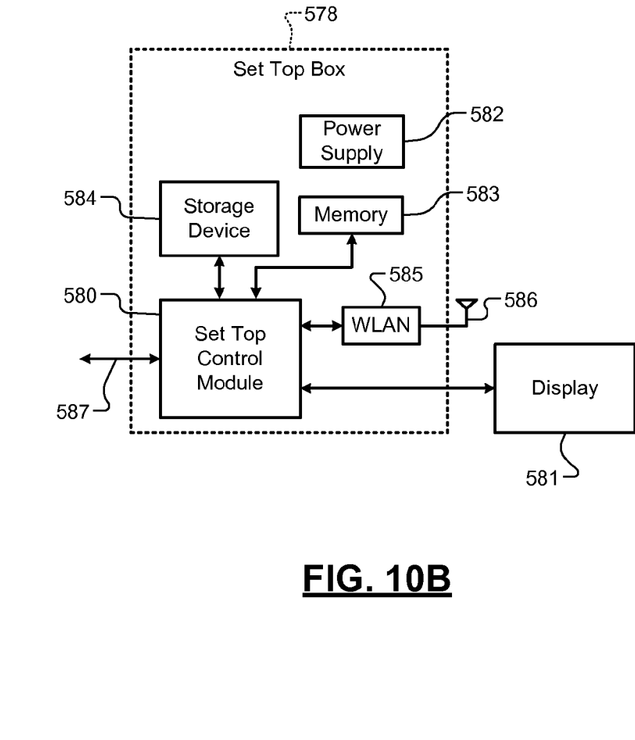
FIG. 10B is a functional block diagram of a set top box.
Figure 10C:
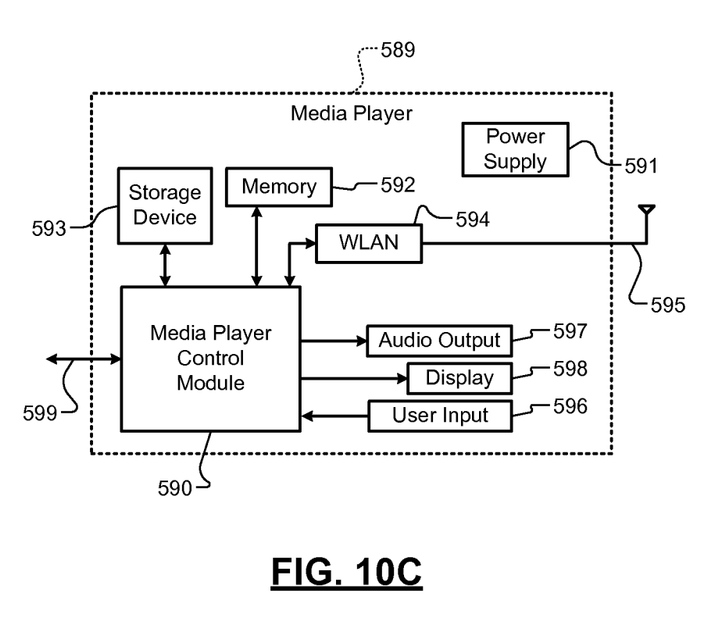
FIG. 10C is a functional block diagram of a media player.

Referring now to FIGS. 10A-10C, various exemplary implementations incorporating the teachings of the present disclosure are shown. Referring now to FIG. 10A, the teachings of the disclosure can be implemented in an external interface 545 of a high definition television (HDTV) 537. The HDTV 537 includes an HDTV control module 538, a display 539, a power supply 540, memory 541, a storage device 542, a WLAN interface 543 and associated antenna 544, and the external interface 545.

The HDTV 537 can receive input signals from the WLAN interface 543 and/or the external interface 545, which sends and receives information received via cable, broadband Internet, and/or satellite. The HDTV control module 538 may process the input signals, including encoding, decoding, filtering, and/or formatting, and generate output signals. The output signals may be communicated to one or more of the display 539, memory 541, the storage device 542, the WLAN interface 543, and the external interface 545.

Memory 541 may include random access memory (RAM) and/or nonvolatile memory such as flash memory, phase change memory, or multi-state memory, in which each memory cell has more than two states. The storage device 542 may include an optical storage drive, such as a DVD drive, and/or a hard disk drive (HDD). The HDTV control module 538 communicates externally via the WLAN interface 543 and/or the external interface 545. The power supply 540 provides power to the components of the HDTV 537.

Referring now to FIG. 10B, the teachings of the disclosure can be implemented in an external interface 587 of a set top box 578. The set top box 578 includes a set top control module 580, a display 581, a power supply 582, memory 583, a storage device 584, and a WLAN interface 585 and associated antenna 586.

The set top control module 580 may receive input signals from the WLAN interface 585 and the external interface 587, which can send and receive information received via cable, broadband Internet, and/or satellite. The set top control module 580 may process signals, including encoding, decoding, filtering, and/or formatting, and generate output signals. The output signals may include audio and/or video signals in standard and/or high definition formats. The output signals may be communicated to the WLAN interface 585 and/or to the display 581. The display 581 may include a television, a projector, and/or a monitor.

The power supply 582 provides power to the components of the set top box 578. Memory 583 may include random access memory (RAM) and/or nonvolatile memory such as flash memory, phase change memory, or multi-state memory, in which each memory cell has more than two states. The storage device 584 may include an optical storage drive, such as a DVD drive, and/or a hard disk drive (HDD).

Referring now to FIG. 10C, the teachings of the disclosure can be implemented in an external interface 599 of a media player 589. The media player 589 may include a media player control module 590, a power supply 591, memory 592, a storage device 593, a WLAN interface 594 and associated antenna 595, and the external interface 599.

The media player control module 590 may receive input signals from the WLAN interface 594 and/or the external interface 599. The external interface 599 may include USB, infrared, and/or Ethernet. The input signals may include compressed audio and/or video, and may be compliant with the MP3 format. Additionally, the media player control module 590 may receive input from a user input 596 such as a keypad, touchpad, or individual buttons. The media player control module 590 may process input signals, including encoding, decoding, filtering, and/or formatting, and generate output signals.

The media player control module 590 may output audio signals to an audio output 597 and video signals to a display 598. The audio output 597 may include a speaker and/or an output jack. The display 598 may present a graphical user interface, which may include menus, icons, etc. The power supply 591 provides power to the components of the media player 589.

Memory 592 may include random access memory (RAM) and/or nonvolatile memory such as flash memory, phase change memory, or multi-state memory, in which each memory cell has more than two states. The storage device 593 may include an optical storage drive, such as a DVD drive, and/or a hard disk drive (HDD).

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of operating a first networking device, the method comprising:
   receiving, from a media server, a cable length request message, wherein the cable length request message includes data indicative of a length of a first networking cable arranged between the media server and the first networking device;
   determining a cumulative cable length based on (i) the length of the first networking cable arranged between the media server and the first networking device and (ii) a length of a second networking cable arranged between the first networking device and a media client, wherein a first end of the second networking cable is attached to the first networking device;
   in response to presence of a second networking device arranged between the first networking device and the media client, sending a further cable length request message to the second networking device, wherein the further cable length request message includes data indicative of the cumulative cable length; and
   in response to absence of the second networking device arranged between the first networking device and the media client, sending a cable length response message to the media server, wherein the cable length response message includes data indicative of the cumulative cable length.

2. The method of claim 1, further comprising determining, at the first networking device, the length of the second networking cable arranged between the first networking device and the media client.

3. The method of claim 2, further comprising:
   storing, in the first networking device, the determined length of the second networking cable arranged between the first networking device and the media client; and
   in response to receiving the cable length request message from the media server, retrieving the stored length of the second networking cable arranged between the first networking device and the media client.

4. The method of claim 2, wherein the determining the length of the second networking cable arranged between the first networking device and the media client includes using Time Domain Reflectometry (TDR).

5. The method of claim 2, wherein the determining the length of the second networking cable arranged between the first networking device and the media client includes transmitting a media access control (MAC) frame and waiting for a corresponding response frame to be received.

6. The method of claim 2, wherein the determining the length of the second networking cable arranged between the first networking device and the media client includes transmitting a physical layer (PHY) frame and waiting for a corresponding response frame to be received.

7. The method of claim 1, wherein:
- a first end of the first networking cable is attached to a network port of the media server,
- a second end of the first networking cable is attached to a first network port of the first networking device, and
- the first end of the second networking cable is attached to a second network port of the first networking device.

8. The method of claim 7, wherein:
- while the second networking device is present between the first networking device and the media client, the second end of the second networking cable is attached to a network port of the second networking device, and
- while the second networking device is absent, the second end of the second networking cable is attached to a network port of the media client.

9. The method of claim 1, wherein the determining the cumulative cable length includes summing the length of the first networking cable arranged between the media server and the first networking device with the length of the second networking cable arranged between the first networking device and the media client.

10. A method of operating a system, the method comprising:
- the method of claim 1, wherein the system includes the first networking device and the media server;
- receiving, at the media server, the cable length response message; and
- selectively granting an access request from the media client in response to the cumulative cable length received in the cable length response message being less than a predetermined threshold.

* * * * *